Nov. 5, 1935.  A. E. TURVILLE  2,019,550
APPARATUS FOR VISUAL TRAINING
Filed Jan. 13, 1933  2 Sheets-Sheet 1

INVENTOR
ALBERT E TURVILLE
PER
Rayment
ATTORNEYS.

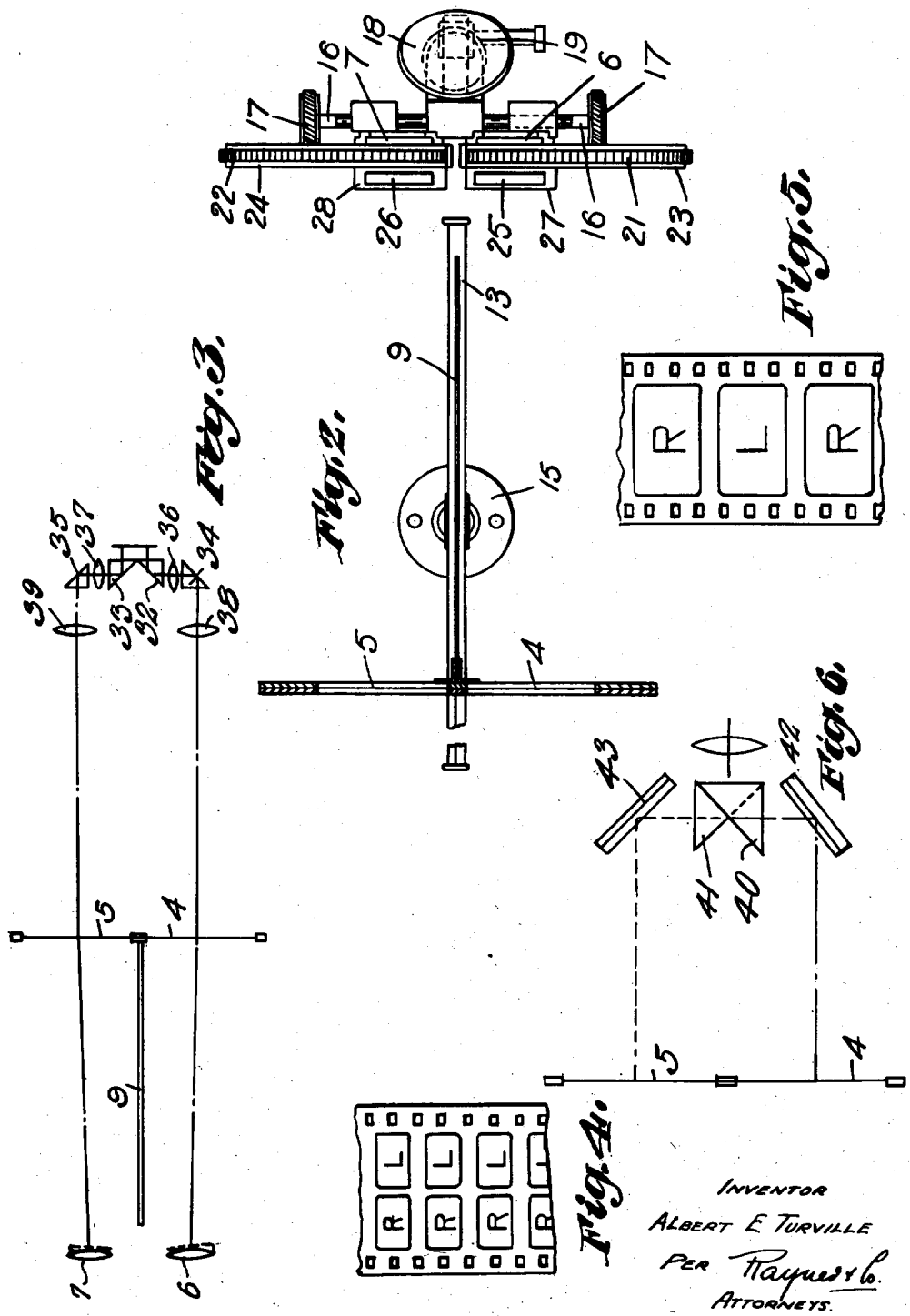

Patented Nov. 5, 1935

2,019,550

UNITED STATES PATENT OFFICE 2,019,550

APPARATUS FOR VISUAL TRAINING

Albert Edward Turville, Northampton, England

Application January 13, 1933, Serial No. 651,563
In Great Britain January 26, 1932

2 Claims. (Cl. 88—20)

This invention comprises apparatus for visual training of the type resembling a stereoscope in which a separate picture is arranged to be viewed by each eye.

The object of this invention is to provide an apparatus which may be used for visual training and which will provide a sufficient interest for the patient whose vision is being trained or exercised to ensure that the required sustained effort will be maintained to render the treatment effective and also to render the treatment less tiring than would otherwise be the case. The apparatus will be useful for general visual training, to obtain binocular fusion sense and stereo sense, for muscle exercising, to stimulate the visual sense of an eye which has become subnormal and for other purposes.

According to this invention my apparatus comprises means for producing two moving images, a pair of binocular sockets or eyepieces adapted to receive interchangeable lenses, prisms, colour filters or the like and means for enabling each eye to see one of the moving images and for preventing each eye from seeing the other moving image. The moving images are projected upon a pair of screens by means of one suitable cinematographic projector.

In order that my invention may be clearly understood and readily carried into effect I have appended hereto two sheets of drawings illustrating embodiments thereof, and wherein:—

Fig. 2 is a plan view of the eyepiece system of Fig. 1.

Fig. 3 is a diagrammatic plan view showing a suitable optical arrangement in which a single projector is employed, the film having the pictures arranged in pairs each pair being adapted to be projected simultaneously.

Figs. 4 and 5 show alternative arrangements of pictures on the film.

Fig. 6 shows diagrammatically a suitable optical system for projecting the pictures arranged on the film as shown in Fig. 5 and in which the projector is arranged upright.

Figure 1:
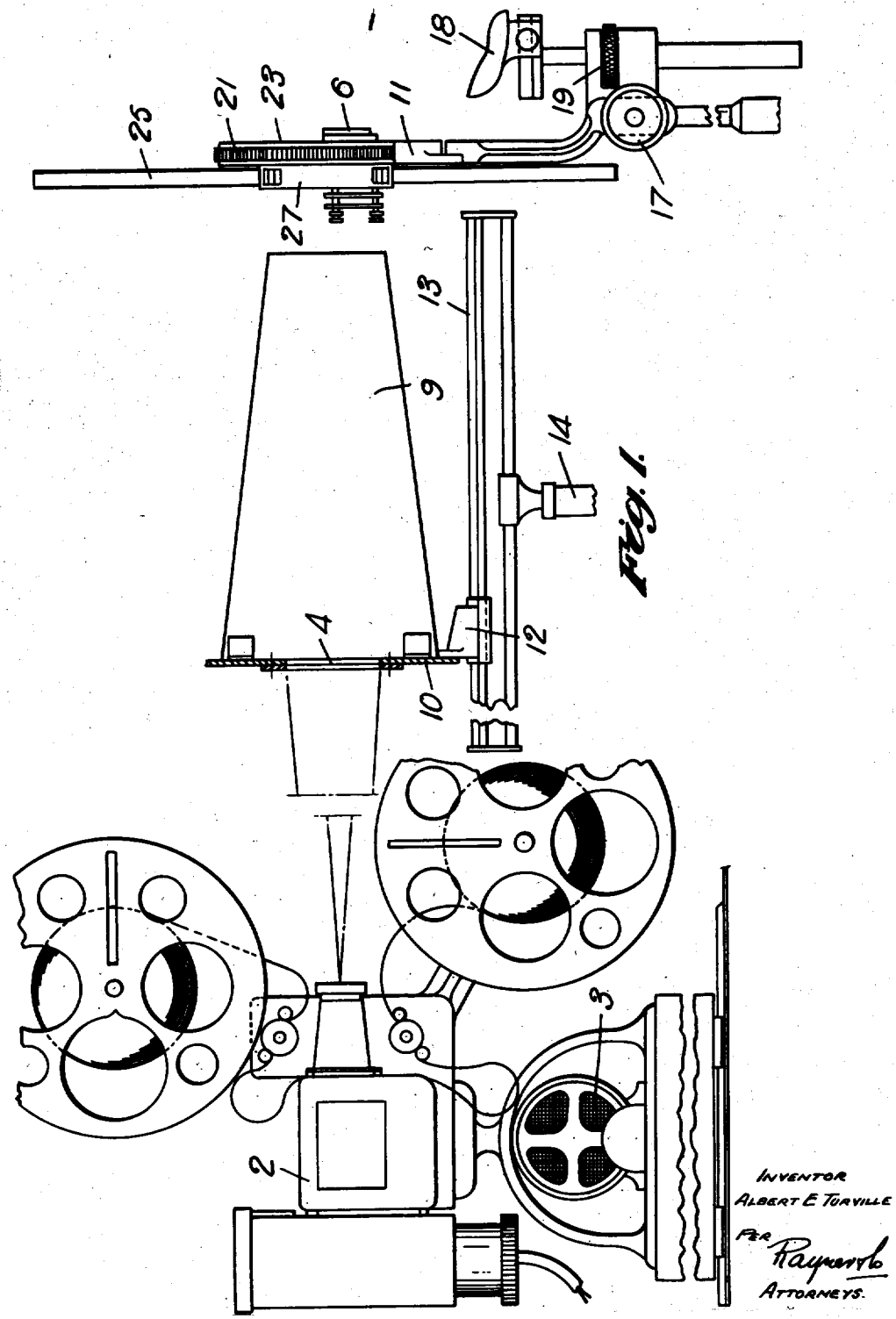
Fig. 1 is a broken side elevation view of one form of the apparatus.

Referring to the drawings in the arrangement shown in Figs. 1 and 2, I employ a projector which can be of the type adapted to project pictures from small width films as employed in hand cinematograph cameras. It can be driven from a motor 3 and project simultaneously the same pictorial matter from the film onto a pair of screens 4 and 5 which are interposed between the projector and a pair of eye sockets 6 and 7 through which the patient views the pictures, it being understood that the screens permit the pictures to be projected through them.

The two screens 4 and 5 are separated for viewing purposes by a longitudinal septum or partition 9 extending from a frame 10 carrying the two screens towards a frame 11 carrying the eye sockets 6 and 7. This screen frame 10 can be adjusted towards and away from the eye sockets and for this purpose can be mounted on a slide carriage 12 slidable on a longitudinal guide bar 13 carried by an oscillatable supporting pillar 14 secured to a suitable base by a flange 15.

The eye sockets can be adjusted towards and away from each other in known manner by worms 16 having milled head 17, and a chin rest 18 vertically adjustable by a milled nut 19 is carried by the frame 11 beneath the eye sockets. The axis of projection of the projector can be moved angularly to compensate for longitudinal adjustment of the screens, by swivelling the projector on a vertical axis.

Each eye socket can be adjusted for focus in any suitable known manner, a graduated focusing scale being provided with each eye socket. A pair of rotatable lens carrying discs 21 and 22 with milled peripheries rotatable in housings 23 and 24 enable a selection of lenses to be readily made for each eye and in conjunction with these discs a pair of vertically slidable lens or prism carrying plates 25 and 26 slidable in guides 27 and 28 carried by the frame 11 provide for a very wide adjustment of lenses to compensate for different degrees of visual inaccuracies. The lenses in these discs 21 and 22 and/or in the plates 25 and 26 can have combined with them or can be shaped to bend or distort the optical axis of each eye socket, for example by forming prismatic surfaces on some of the lenses or employing prisms or correcting plates instead of some of the lenses.

In the foregoing construction the projector is arranged in rear of the screen frame 10.

A single projector can be employed with a film bearing two sets of pictures adapted to be projected simultaneously in pairs for example by employing a film as shown in Fig. 4 with the pictures R and L arranged in transverse pairs, and employing for example the optical system shown in Fig. 3 in which the lens mount of the projector has adapted to it a mount containing two right angle prisms 32 and 33, and two further right angle prisms 34 and 35 which may be cemented to or formed with the prisms 32 and 33 or separated with correcting lenses 36 and 37 between them. Lenses 38 and 39 project the images on to the screens 4 and 5.

In Fig. 5, I have shown an arrangement of pairs of pictures on a film in which a single projector is employed. In this arrangement the pictures are arranged in pairs on a single line and two pictures R and L are fed simultaneously into the gate of the projector which may be arranged on its side to enable the optical system shown in Fig. 3 to be adopted. However, should it be preferred to arrange the projector vertically, the optical system shown in Fig. 6 can be employed in which a pair of right angle prisms 40, 41 are located one above the other so as to deflect the projected beam in opposite directions, and a pair of mirrors 42, 43 with their reflecting faces slightly inclined in opposite directions to the vertical plane reflect the images onto the screens 4 and 5, or the pictures R and L may be projected alternatively onto their respective screens.

Apparatus for visual training according to this invention will enable any desired form of exercise or training of the vision to be carried out while at the same time maintaining the patient's interest and may even entertain or instruct them at the same time.

I claim:—

1. Apparatus for visual training comprising a pair of transparent screens, a frame carrying them, a projector common to both said screens, a septum carried by said frame, a pair of eye-pieces, a plurality of lenses with each eye piece, means for readily successively bringing said lenses into the eye pieces, means for adjusting the said screen and septum carrying frame towards and away from the eye pieces, a film with pictur 3 arranged in pairs and means to feed it through a single gate in the projector and image separating means between the gate and the screens on to which both pictures are projected by a single beam of the projector to divide said beam into two picture carrying beams adapted to pass separately through to the two screens.

2. Apparatus for visual training comprising a screen frame, and an eyepiece frame, a septum mounted in and extending from the screen frame towards the eyepiece frame, a pair of transparent screens on said screen frame separated by said septum, a slide for moving said screen frame towards and away from said eyepiece frame, a single cinematograph machine with a single projection lens system, an optical combination splitting the projected matter into two beams laterally separated at the said screen frame, a single gate with the projector and a film divided into simultaneously projected pairs of pictures adapted to be projected on to said screens, a pair of eye sockets in said eyepiece frame, and a plurality of lenses of different foci with each eye socket adapted to be selectively brought into the eye sockets.

ALBERT EDWARD TURVILLE.